(12) United States Patent
Kasai et al.

(10) Patent No.: US 7,619,337 B2
(45) Date of Patent: Nov. 17, 2009

(54) BRUSHLESS MOTOR, BRUSHLESS TYPE FAN MOTOR AND ELECTRIC DEVICE COMPRISING A BRUSHLESS TYPE FAN MOTOR

(75) Inventors: Toshiaki Kasai, Itabashi-ku (JP); Tomoaki Hoshina, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 367 days.

(21) Appl. No.: 11/651,428

(22) Filed: Jan. 8, 2007

(65) Prior Publication Data

US 2007/0176508 A1 Aug. 2, 2007

(30) Foreign Application Priority Data

Jan. 20, 2006 (JP) .............................. 2006-012854

(51) Int. Cl.
*H02K 5/00* (2006.01)
*H02K 21/12* (2006.01)
*F04B 17/00* (2006.01)

(52) U.S. Cl. .................. 310/89; 310/156.32; 310/67 R; 417/420; 417/423.7

(58) Field of Classification Search ............... 310/67 R, 310/89, 91, 156.32, 268; 360/98.07, 99.08, 360/99.12; 417/420, 423.1, 423.12, 423.7, 417/424.1
See application file for complete search history.

(56) References Cited

U.S. PATENT DOCUMENTS

| 4,620,139 | A | * | 10/1986 | Egami et al. ............ 318/400.01 |
| 5,528,436 | A | * | 6/1996 | Peter ........................ 360/99.08 |
| 7,456,541 | B2 | * | 11/2008 | Horng et al. ................. 310/268 |
| 2007/0090698 | A1 | * | 4/2007 | Yasuda ...................... 310/49 R |

FOREIGN PATENT DOCUMENTS

| JP | 11-8951 | 1/1999 |
| JP | 2000156960 A | * 6/2000 |

* cited by examiner

*Primary Examiner*—Tran N Nguyen
(74) *Attorney, Agent, or Firm*—Beyer Law Group LLP

(57) ABSTRACT

In a fan motor, there are provided protruding portions provided integrally with a base member so as to face a magnet and protrude toward the magnet, and openings facing the magnet, in the base member made of magnetic material. As to the positional relation between the protruding portions and the openings, when the protruding portions are positioned corresponding to centers of the magnetic poles, the openings are positioned corresponding to boundaries between the magnetic poles. As to the positional relation between the protruding portions and the coils, when the protruding portions are positioned corresponding to centers of the magnetic poles, both ends of the coils are positioned corresponding to positions other than the boundaries between the magnetic poles.

9 Claims, 12 Drawing Sheets

BRUSHLESS MOTOR, BRUSHLESS TYPE FAN MOTOR AND ELECTRIC DEVICE COMPRISING A BRUSHLESS TYPE FAN MOTOR

BACKGROUND OF THE INVENTION

1. Field of the Invention

The present invention relates to a brushless motor and a brushless type fan motor including a rotor having a magnet and a stator having a coil facing the rotor, and an electronic device comprising the brushless type fan motor.

2. Related Background of the Invention

A fan motor described in Patent Document 1 shown below has been known as a conventional technology in this field. This fan motor including a rotor having a magnet and a stator having a coil, and a wind is generated by vanes provided on the rotor. This fan motor has a rising portion formed by protruding a portion of a frame toward a rotor side. A proposal has been made to control a stop position of the rotor by an attraction between the rising portion and magnet so that the rotor should not stop at a dead point.

[Patent Document 1] Japanese Patent Application Laid-Open No. Hei 11-8951

However, only with the rising portion in the fan motor, the attraction between the magnet and the portion may not be sufficient and the stop position of the rotor may not be sufficiently controlled. If, in such a case, the rotor stops at a dead point, the rotor cannot be restarted. Thus, for this type of motor, reliable controllability of the stop position of the rotor has been demanded.

Thus, an object of the present invention is to provide a brushless motor and a brushless type fan motor that can reliably control the stop position of the rotor, and an electronic device comprising the brushless type fan motor.

SUMMARY OF THE INVENTION

A brushless motor according to the present invention is a brushless motor for rotating a rotor in a housing by supplying a current to coils, and the brushless motor includes: the rotor having a magnet in which N and S magnetic pole pairs are alternately arranged in a direction of rotation; and a stator having the coils provided so as to face the magnet, wherein in the housing made of magnetic material, there are provided protruding portion provided integrally with the housing so as to face the magnet and protrude toward the magnet, and opening facing the magnet, as to the positional relation between the protruding portion and the opening, when the protruding portion is positioned corresponding to center of the magnetic pole, the opening is positioned corresponding to boundary between the magnetic poles, and as to the positional relation between the protruding portion and the coils, when the protruding portion is positioned corresponding to the center of the magnetic pole, both ends of the coils are positioned corresponding to positions other than the boundary between the magnetic poles.

The brushless motor includes the housing made of magnetic material. The housing has protruding portion provided integrally so as to protrude toward the magnet of the rotating rotor and opening formed at positions facing the magnet. Since the protruding portion of magnetic material exert an attraction on the magnetic poles of the magnet, the rotor stabilizes in a state in which the center of the magnetic poles where the attraction is strongest is positioned corresponding to the protruding portion of the housing. Thus, when the coils are not energized, the rotor stops in such a state. Then, according to the positional relation between the coils and the protruding portion, both ends of the coils are positioned corresponding to any positions other than the boundary between the magnetic poles in the stopped state above. Thus, in the stopped state of the rotor, both ends of the coils generating a torque of the rotor will not correspond to the positions of the boundary between the magnetic poles, which are dead points. That is, the protruding portion has a function to control the stop position of the rotor to a position other than a dead point of the rotor. Since the stop position of the rotor can be controlled by the protruding portion, which is integral with the housing, a flux plate for controlling the stop position of the rotor becomes unnecessary and, as a result, thickness of the motor can be reduced by the thickness of the flux plate.

Further, according to the positional relation between the protruding portion and the opening formed in the housing, the opening is positioned corresponding to the boundary between the magnetic poles of the magnet in the stopped state above. Since here the housing is made of magnetic material, the opening that is portion in the housing without magnetism to exert an attraction on the boundary between the magnetic poles. Thus, the opening has a function to further stabilize the stopped state to reliably control the stopped state of the rotor. Since the stop position of the rotor in the brushless motor is controlled not only by the protruding portion, but also by the opening, the stop position of the rotor can reliably be controlled.

It is preferable that the brushless motor according to the present invention further include a circuit board on which the coils are mounted, wherein the circuit board has positioning through hole formed corresponding to the protruding portion. If such a structure is adopted, the circuit board can reliably be positioned only by inserting the protruding portion through the positioning through hole of the circuit board, improving accuracy of the positional relation among the coils, protruding portion, and opening and also assembly workability.

It is also preferable that the protruding portion be formed in a cylindrical shape. This arrangement facilitates pressing the protruding portion and allows the circuit board to be reliably fixed.

A brushless type fan motor of the present invention includes any of the brushless motor above and vanes fixed to a rotation shaft of the rotor. The stop position of the rotor can reliably be controlled in the brushless type fan motor by collaboration between the protruding portion and opening provided in the housing, and thus the thickness of fan motor can also be reduced.

Also, an electronic device according to the present invention includes the brushless type fan motor described above.

In a brushless motor, a brushless type fan motor, and an electronic device comprising the brushless type fan motor of the present invention, the stop position of the rotor can reliably be controlled.

Figure 1:
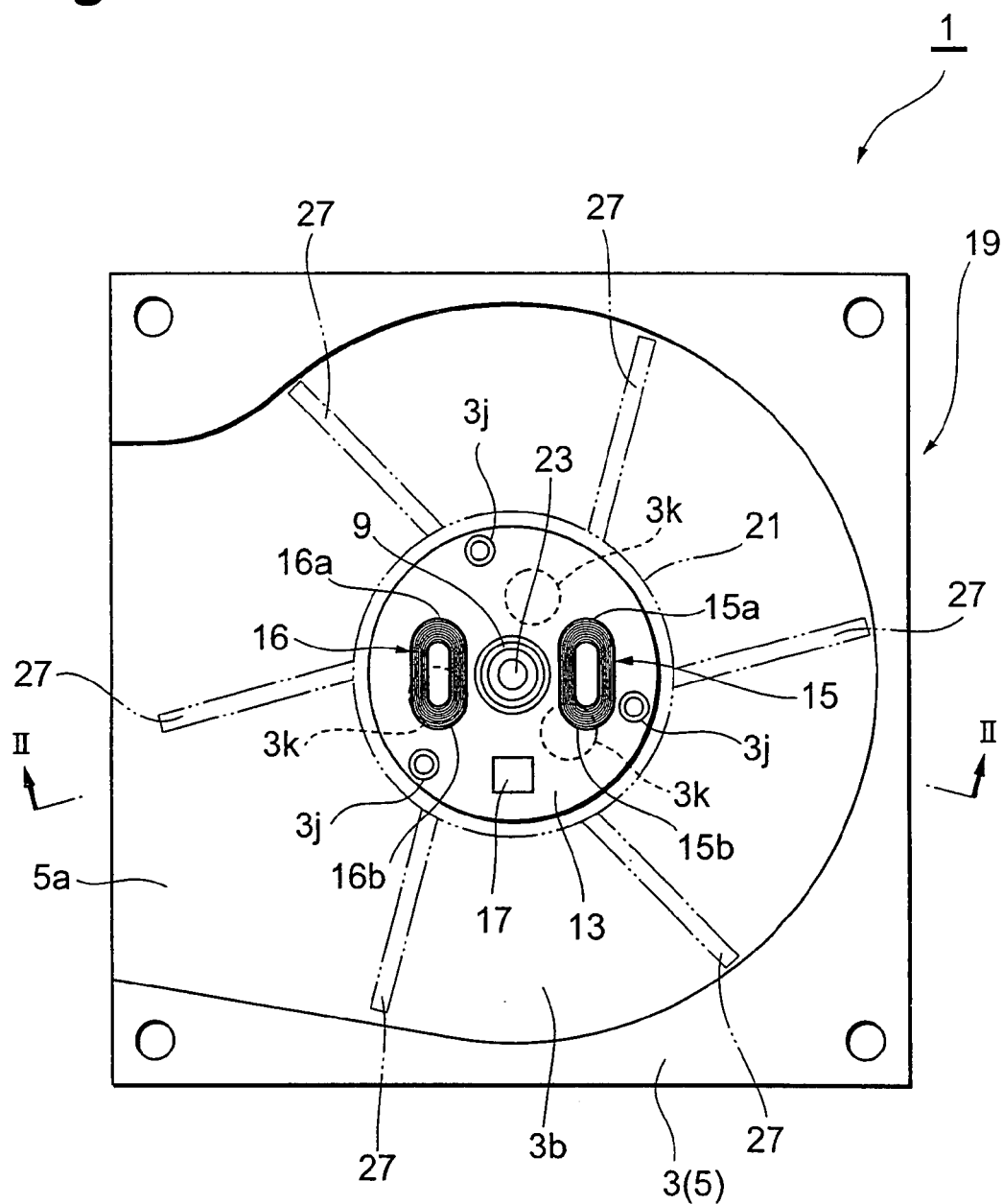
FIG. 1 is a plan view showing a brushless type fan motor according to a first embodiment of the present invention.
Figure 2:
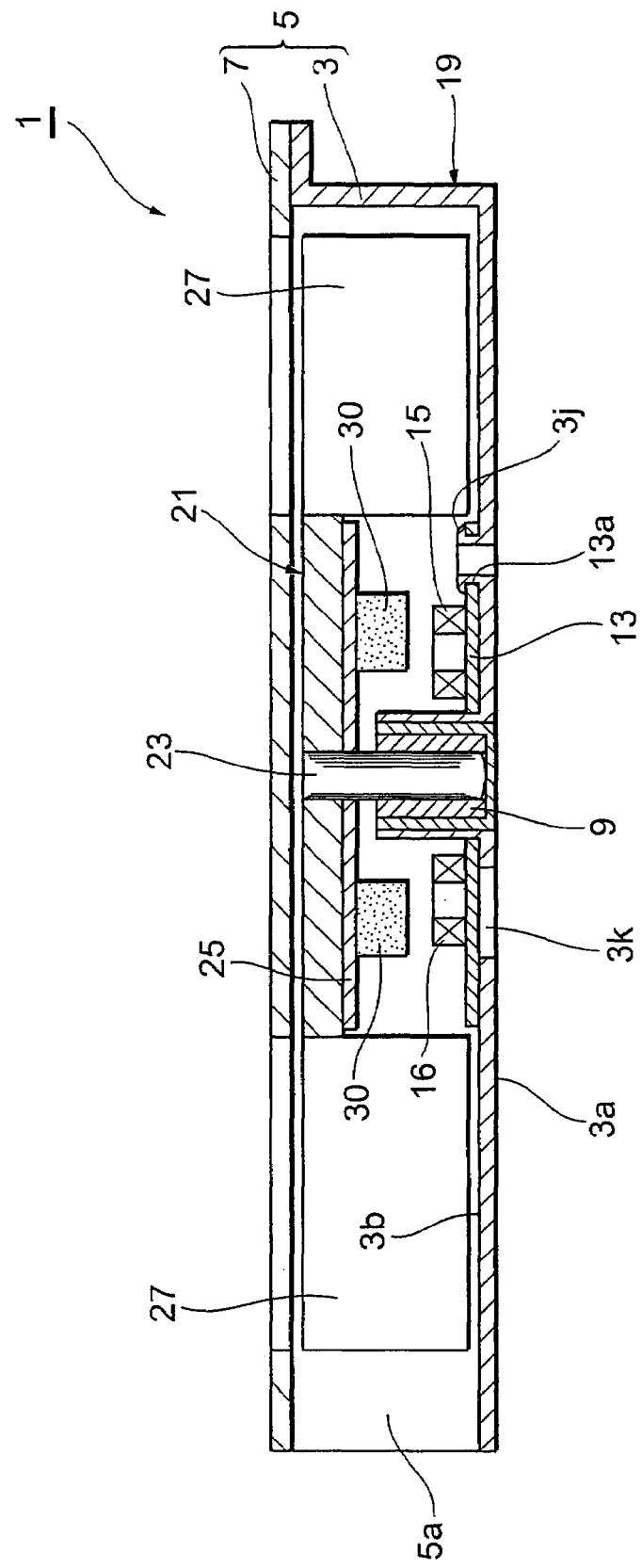
FIG. 2 is a II-II sectional view of the fan motor in FIG. 1.
Figure 3:
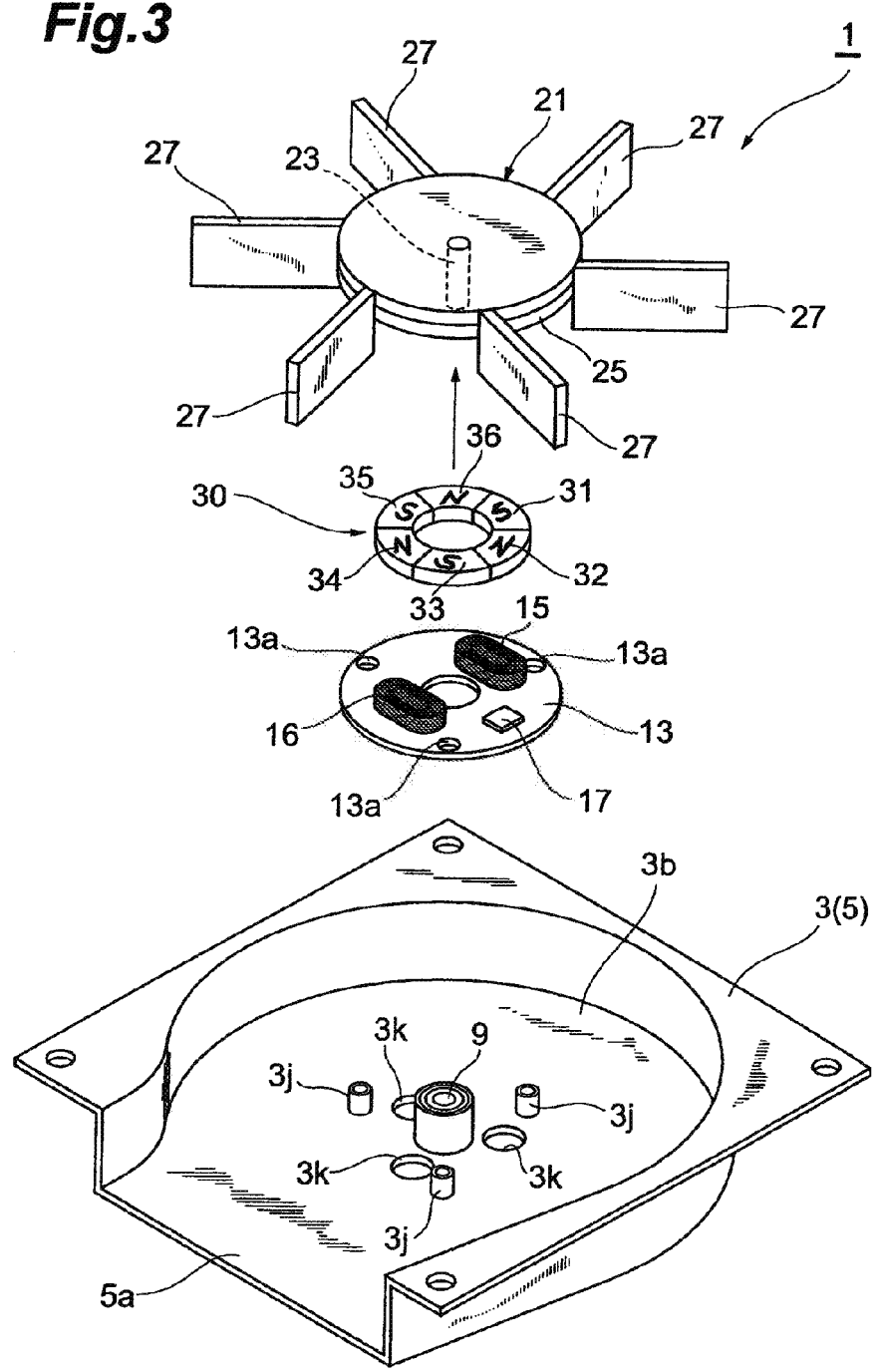
FIG. 3 is an exploded perspective view of the fan motor in FIG. 1.
Figure 4:
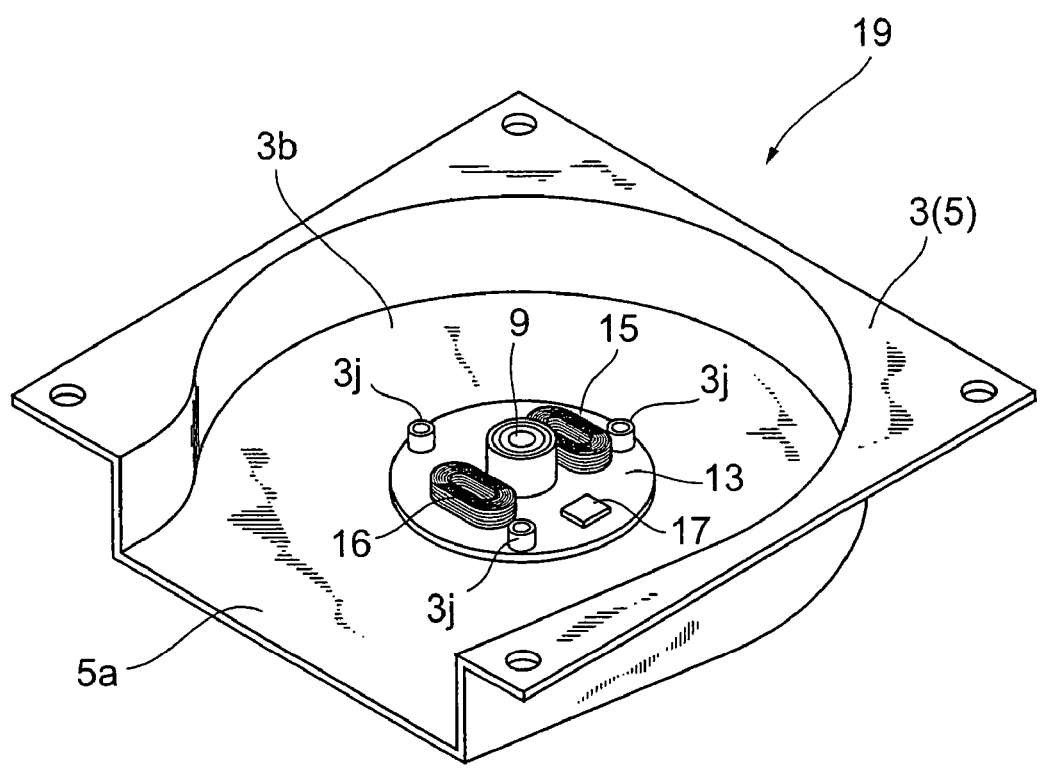
FIG. 4 is a perspective view showing a stator of the fan motor in FIG. 1.

EXPLANATION OF NUMERALS 1, 51. Brushless motor, 3, 53. Base member (housing), 3*j*, 53*j*. Protruding portion, 3*k*, 53*k*. Opening, 13, 63. Circuit board, 13*a*, 63*a*. Through hole, 15, 16. Coil, 15*a*, 15*b*, 16*a*, 16*b*. Coil end, 21. Rotor, 23. Shaft (rotation shaft), 27, 77. Vane, 30. Magnet, 31 to 36. Magnetic pole

DESCRIPTION OF THE PREFERRD EMBODIMENTS

Suitable embodiments of a brushless motor according to the present invention will be described below with reference to drawings.

First Embodiment

As shown in FIG. 1 to FIG. 4, a fan motor 1 is a brushless motor that rotates a rotor 21 provided with vanes 27 to generate a wind in a radial direction of rotation thereof. The fan motor 1 includes a base member 3 having a mounting surface 3*a* to be mounted on a mounting board (not shown) of a device and a component mounting surface 3*b* facing the mounting surface 3*a*. The fan motor 1 has a housing 5 in which the rotating rotor 21 is housed and the housing 5 is composed of the base member 3 and a cover 7 that closes part of the base member 3. Also, a blowing opening 5*a* for sending out a wind generated in a diameter direction by rotation of the rotor 21 is provided on one side of the housing 5. The base member 3 of the housing 5 is formed of electromagnetic steel sheet which is a magnetic material, and an outer shape thereof is approximately square. The housing 5 has, for example, only a size of breadth 11 mm×width 11 mm×height 3 mm as a result of miniaturization.

In the housing 5, a radial bearing 9 is provided in the center of the component mounting surface 3*b* of the base member 3, and a shaft (a rotation shaft) 23 of the rotor 21 is freely rotatably supported by the radial bearing 9. Also, three protruding portions 3*j* provided integrally with the base member 3 are provided on the component mounting surface 3*b* of the base member 3. These protruding portions 3*j* are positioned equidistantly around the shaft 23 and formed by burring into a cylindrical shape so as to protrude toward the rotor 21. Three circular openings 3*k* positioned among the protruding portions 3*j* are formed equidistantly around the shaft 23 in the base member 3.

Figure 5:
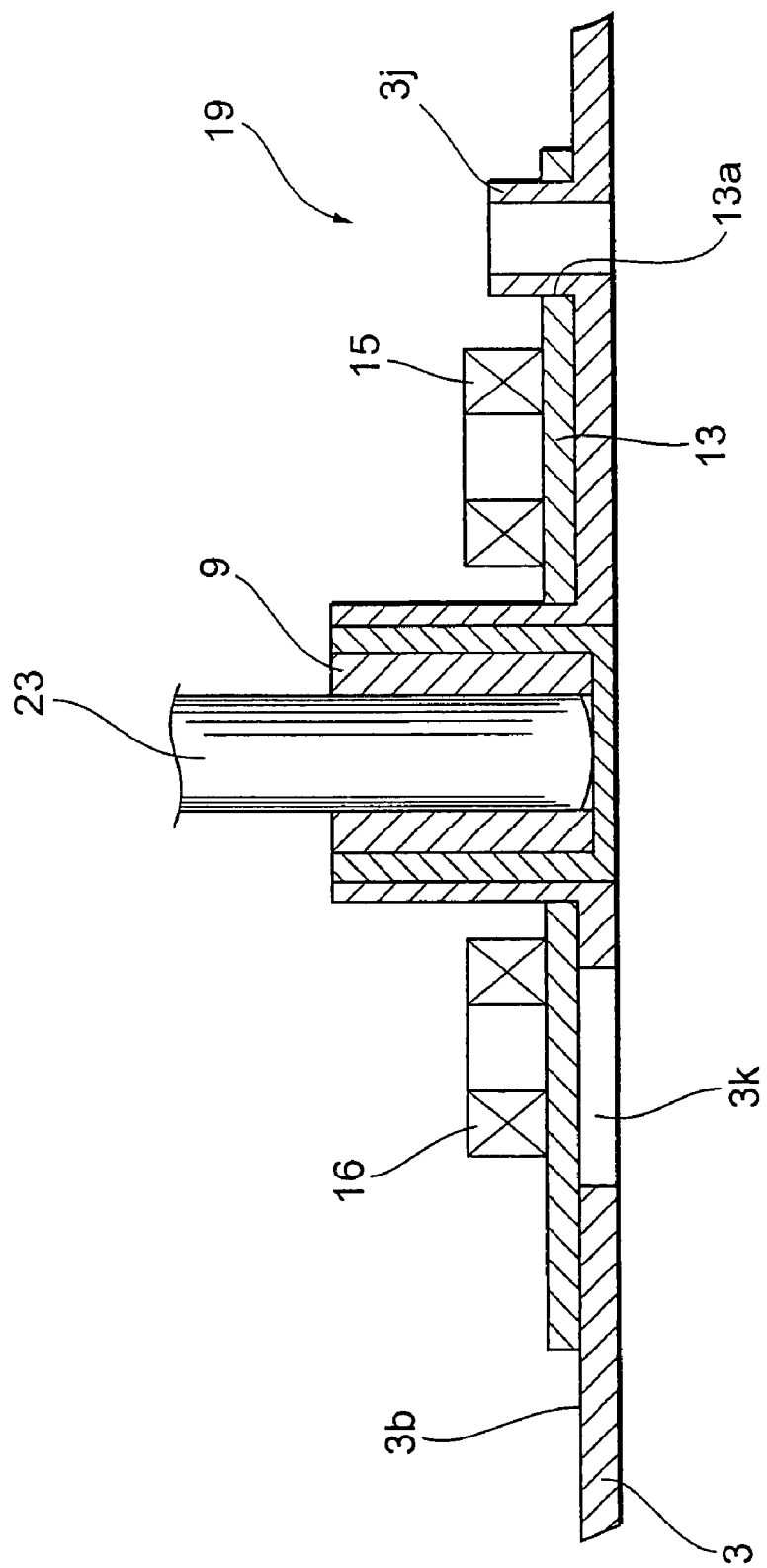
FIG. 5 is a sectional view showing a process of fixing a circuit board to a base member in the fan motor of FIG. 1.
Figure 6:
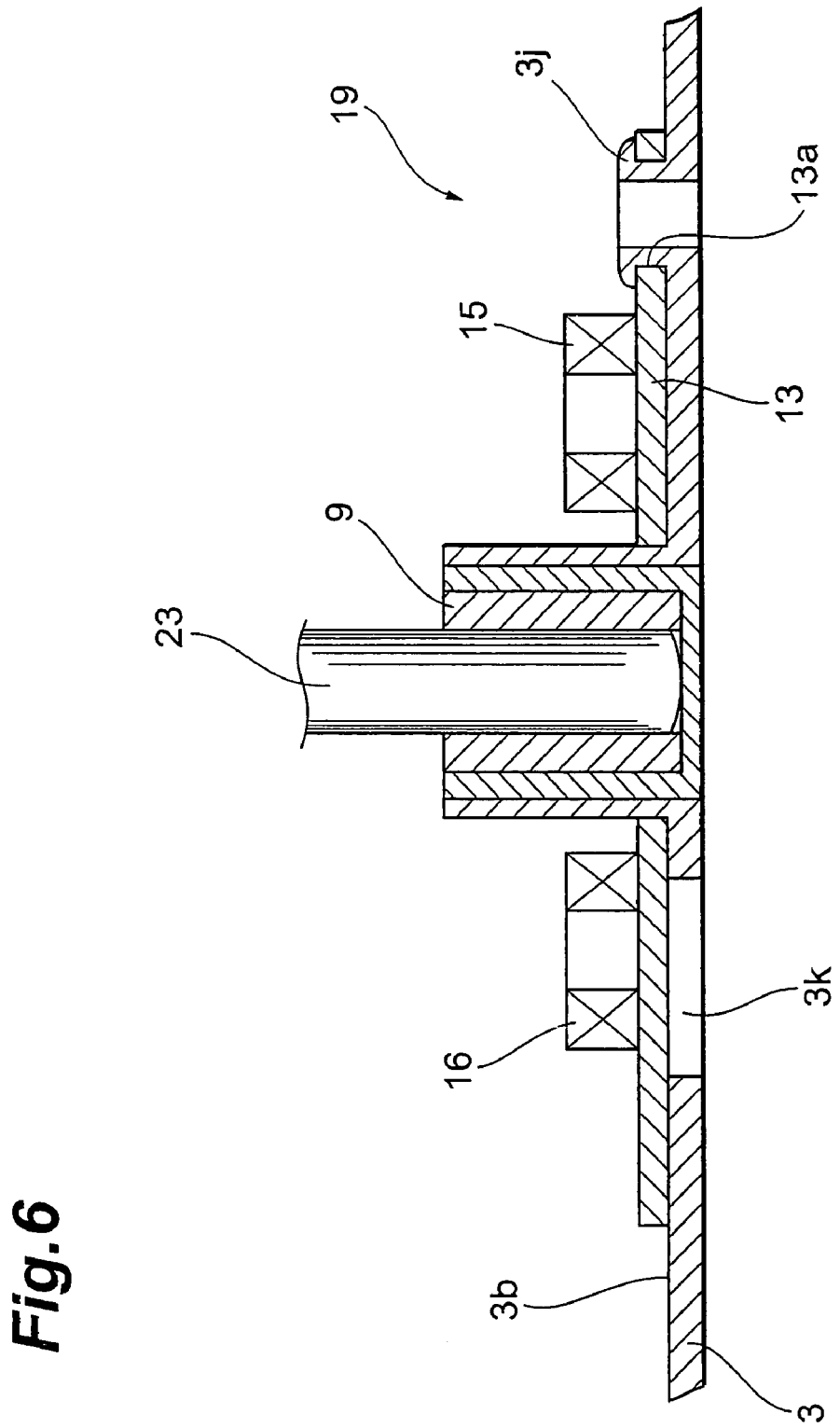
FIG. 6 is a sectional view showing the process of fixing the circuit board to the base member in the fan motor of FIG. 1.

Then, a circuit board 13 having an approximately circular shape around the shaft 23 is fixed on the component mounting surface 3*b* of the base member 3 so as to cover these openings 3*k*. The circuit board 13 is formed of a flexible wiring board or the like, and wiring is formed on a top surface thereof by printing. The circuit board 13 has three through holes 13*a* corresponding to the protruding portions 3*j* of the base member 3. The circuit board 13 is fixed to the component mounting surface 3*b* by inserting the protruding portions 3*j* into the through holes 13*a* (See FIG. 5) and pressing (See FIG. 6) during assembly. The circuit board 13 is thus positioned accurately on the component mounting surface 3*b* only by the through holes 13a being inserted into by the protruding portions 3*j*. Since the protruding portions 3*j* have a cylindrical shape, the protruding portions 3*j* after being inserted through the through holes 13*a* can easily be pressed and the circuit board 13 is reliably fixed to the component mounting surface 3*b* by a strong fixing force. As a result, the positional relation among components such as coils 15 and 16 to be described later on the circuit board 13, the protruding portions 3*j*, and the openings 3*k* can be improved in its accuracy, leading to improvement of assembly workability.

Two coils 15 and 16 are fixed on the circuit board 13 so as to sandwich the shaft 23. These coils 15 and 16 are composed of a flat coil. Further, a Hall element 17 for detecting magnetism and other electronic components are also mounted on the circuit board 13. Power feeding to the coils 15 and 16 is controlled based on an electric signal from the Hall element 17. A stator 19 for rotating the rotor 21 is composed of the above-described housing 5, circuit board 13, coils 15 and 16, Hall element 17, and other electronic components on the circuit board 13.

As described above, the rotor 21, on the other hand, has the shaft 23 supported by the base member 3 via the radial bearing 9. Further, a small disc-like rotor yoke 25 of about 8 mm in diameter rotating integrally with the shaft 23 is fixed to the shaft 23. A ring-shaped magnet 30 is fixed to the underside of the rotor yoke 25 via adhesives to face the coils 15 and 16 provided on the circuit board 13.

The magnet 30 has six magnetic poles 31 to 36 arranged equidistantly in a direction of rotation of the rotor 21. Of these six magnetic poles 31 to 36, the magnetic poles 31, 33, and 35 are magnetized so that the undersides thereof are N poles and the magnetic poles 32, 34, and 36 are magnetized so that the undersides thereof are S poles. The magnet 30 thus constitutes a six-pole magnet having six magnetic poles 31 to 36 formed by alternately arranging N and S magnetic pole pairs in a fan-shape whose central angle is 60°.

Further, six vanes 27 are attached on the rotor 21. These vanes 27 are arranged equidistantly in the direction of rotation of the rotor 21, are fixed to the shaft 23 and the rotor yoke 25 of the rotor 21, and are pushed out in the radial direction from a periphery border of the rotor yoke 25. These vanes 27 are rotated integrally together with the rotor 21 and the shaft 23 to generate a wind flowing in parallel with the direction of rotation. That is, the vanes 27 and the rotor 21 function as a centrifugal fan generating a wind by rotation.

Figure 7:
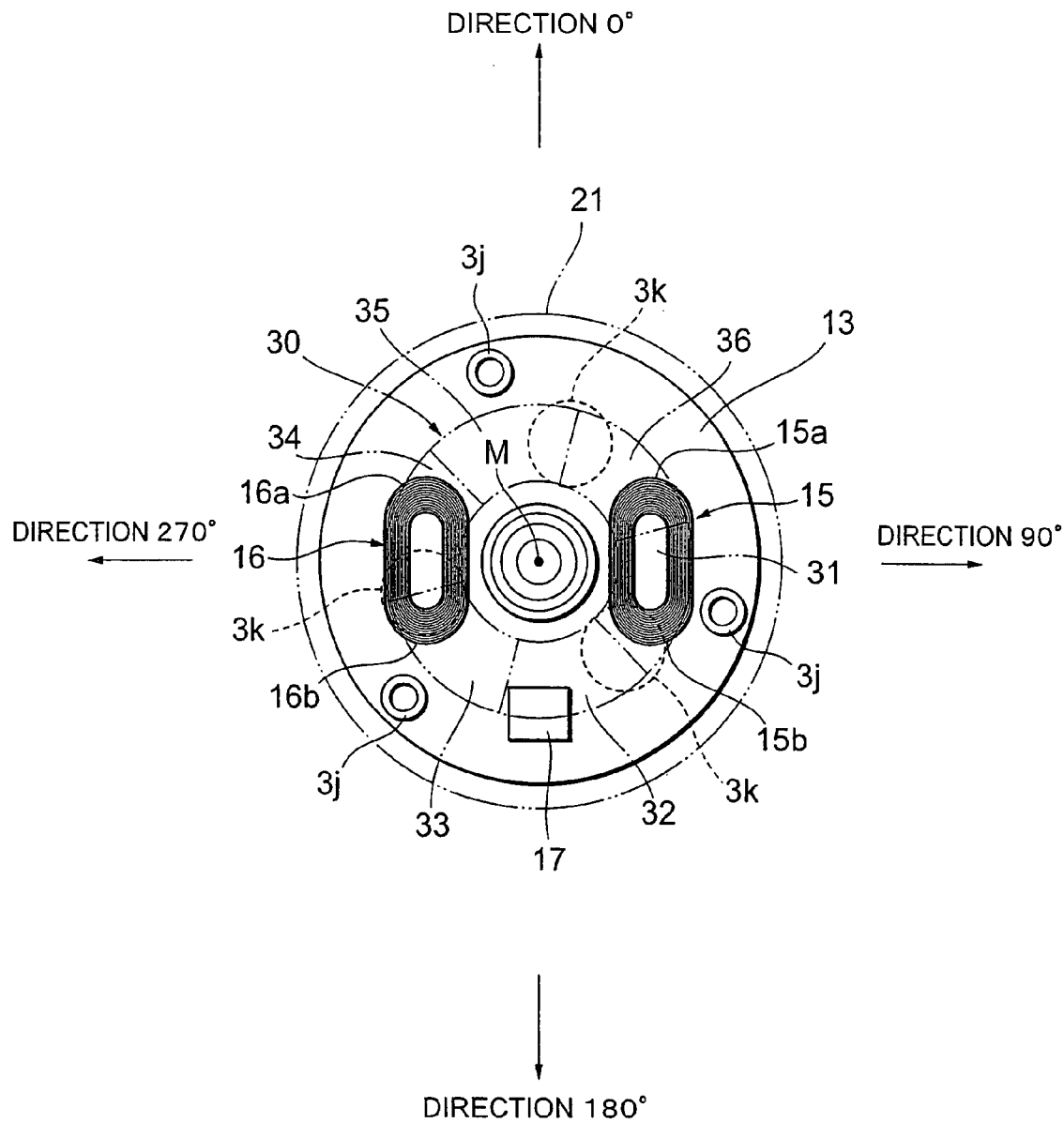
FIG. 7 is a plan view showing positional relation among protruding portions, openings, coils, and a magnet in a stopped state of a rotor of the fan motor in FIG. 1

Next, the positional relation among portions on the stator 19, arranged for rotating the above-described rotor 21 will be described. For a description of arrangement of each portion below, an upward direction in FIG. 7 is assumed to be a 0° direction and the direction of each portion viewed from a rotation center M of the rotor 21 is denoted as "XX° direction." In this case, for example, a right direction in FIG. 7 is denoted as a 90° direction, a downward direction as a 180° direction, and a left direction as a 270° direction.

First, the coil 15 on the circuit board 13 is arranged so that end 15*a* thereof is positioned in a 60° direction and the end 15*b* thereof is positioned in a 120° direction. The coil 16 is arranged so that end 16*a* thereof is positioned in a 300° direction and the end 16*b* thereof is positioned in a 240° direction. Since the directions of currents of the coils 15 and 16 coincide with the diameter direction of the rotor 21 at each of the coil ends 15*a*, 15*b*, 16*a*, and 16*b*, these ends 15*a*, 15*b*, 16*a*, and 16*b* have a function as a torque generating portion generating driving torque of the rotor 21 by an electromagnetic force. The Hall element 17 on the circuit board 13 is arranged in the 180° direction.

In contrast, the three protruding portions 3*j* of the base member 3 are arranged in a 105° direction, a 225° direction, and a 345° direction. Since each of these protruding portions 3*j* is a portion of the base member 3 made of magnetic material and a portion of the base member 3 nearest to the magnet 30, each protruding portion 3*j* has an attraction on each of magnetic poles 31 to 36 of the magnet 30.

Also, the three openings 3k of the base member 3 are arranged in a 15° direction, a 135° direction, and a 255° direction. Since such openings 3k are formed in the base member 3 made of magnetic material, the attraction on each of magnetic poles 31 to 36 of the magnet 30 is weakened locally only at positions of the openings 3k in the base member 3. Thus, boundary lines of the magnetic poles 31 to 36 of the magnet are attracted to the openings 3k. That is, each opening 3k has an apparent attraction on the boundaries among the magnetic poles 31 to 36 of the magnet 30.

According to such positional relation, as shown in FIG. 7 for example, each of the three openings 3k is positioned respectively corresponding to the boundary between the magnetic poles 35 and 36, that between the magnetic poles 31 and 32, and that between the magnetic poles 33 and 34, when each of the three protruding portions 3j is positioned corresponding to the centers of the magnetic poles 31, 33, and 35. At this point, each of the four coil ends 15a, 15b, 16a, and 16b is also positioned corresponding to any position other than the boundaries among the magnetic poles 31 to 36. More specifically, each of the four coil ends 15a, 15b, 16a, and 16b is positioned by shifting counterclockwise by 15° from the boundaries among the magnetic poles 31 to 36.

If, based on the structure above, a current is supplied to the coils 15 and 16, a current in the radial direction of the rotor 21 is generated at the coil ends 15a, 15b, 16a, and 16b and this current causes an electromagnetic force on the magnetic poles 31 to 36 in a circumferential direction. Also, cogging torque obtained by combining torque generated by the attraction from the above protruding portion 3j and that generated by the apparent attraction from the opening 3k acts on the magnetic poles 31 to 36. Thus, the rotor 21 will be rotated around the shaft 23 by the combined torque of the above torque caused by an electromagnetic force and the cogging torque.

Then, according to the positional relation between the coils 15 and 16 and the Hall element 17 described above, the magnetic poles 31 to 36 at the position of the Hall element 17 interchange at the same timing as that when the magnetic poles 31 to 36 corresponding to the positions of the coil ends 15a, 15b, 16a, and 16b interchange while the rotor 21 rotates. That is, magnetic fields generated at the positions of the coil ends 15a, 15b, 16a, and 16b by the magnetic poles 31 to 36 are inverted at this time, and the pole of the magnetic pole detected by the Hall element 17 is inverted at the same timing. Thus, with power feeding to the coils 15 and 16 being controlled so that the current supplied to the coils 15 and 16 is inverted at the same timing as that when the pole detected by the Hall element 17 is inverted, an electromagnetic force in the same direction will always act on the magnetic poles 31 to 36, leading to continuous rotation of the rotor 21.

If, then, power feeding to the coils 15 and 16 is stopped, rotation of the rotor 21 attenuates and stops. At this time, an attraction from the protruding portions 3j acts on each of the magnetic poles 31 to 36 of the magnet 30, as described above. Thus, receiving this attraction, the rotor 21 comes to a stop at a position (See FIG. 7) where the centers of three of the magnetic poles 31 to 36 correspond to the protruding portions 3j respectively.

At this time, an apparent attraction from the openings 3k acts on the boundaries among the magnetic poles 31 to 36. Then, according to the positional relation between the protruding portions 3j and openings 3k described above and arrangement of the magnetic poles 31 to 36 in the magnet 30, this attraction also acts to cause the rotor 21 to stop in the stopped state above. That is, the above two kinds of attraction act together to lead the rotor 21 to the above stopped state. Then, in the stopped state, the coil ends 15a, 15b, 16a, and 16b, which are torque generating portions, are positioned shifted from the boundaries among the magnetic poles 31 to 36 which are the dead points. More specifically, each of the four coil ends 15a, 15b, 16a, and 16b is positioned being shifted counterclockwise by 15° from the boundaries among the magnetic poles 31 to 36.

In the motor fan 1, as described above, the rotor 21 stabilizes to stop at a position being shifted from a dead point not only by the attraction from the protruding portions 3j, but also by the added attraction by the openings 3k. Since the stop position of the rotor 21 can reliably be controlled so as to avoid dead points in the motor fan 1, as described above, rotation of the rotor 21 starts smoothly when a current flows to the coils 15 and 16 to start the motor next time.

A flux plate with thickness of 0.2 to 0.3 mm has conventionally been provided for a motor with thickness of about 3 mm to control the stop position of the rotor 21, but the flux plate can be omitted according to the structure of the fan motor 1. Also, by providing the protruding portions 3j integrally with the base member 3, an installation space of the motor 1 in the direction of thickness is minimized. As a result, according to the structure of the fan motor 1, the thickness of the motor can be reduced.

Only one protruding portion 3j and one opening 3k may be provided for the base member 3, but it is preferable to arrange a plurality of protruding portions 3j and a plurality of openings 3k equidistantly like the fan motor 1 above. Since in this case a well-balanced attraction in the diameter direction acts on the rotor 21, the rotor 21 in the stopped state will be well balanced. If a plurality of protruding portions 3j are provided, accuracy of positioning and the fixing force of the circuit board 13 will improve.

Second Embodiment

Figure 8:
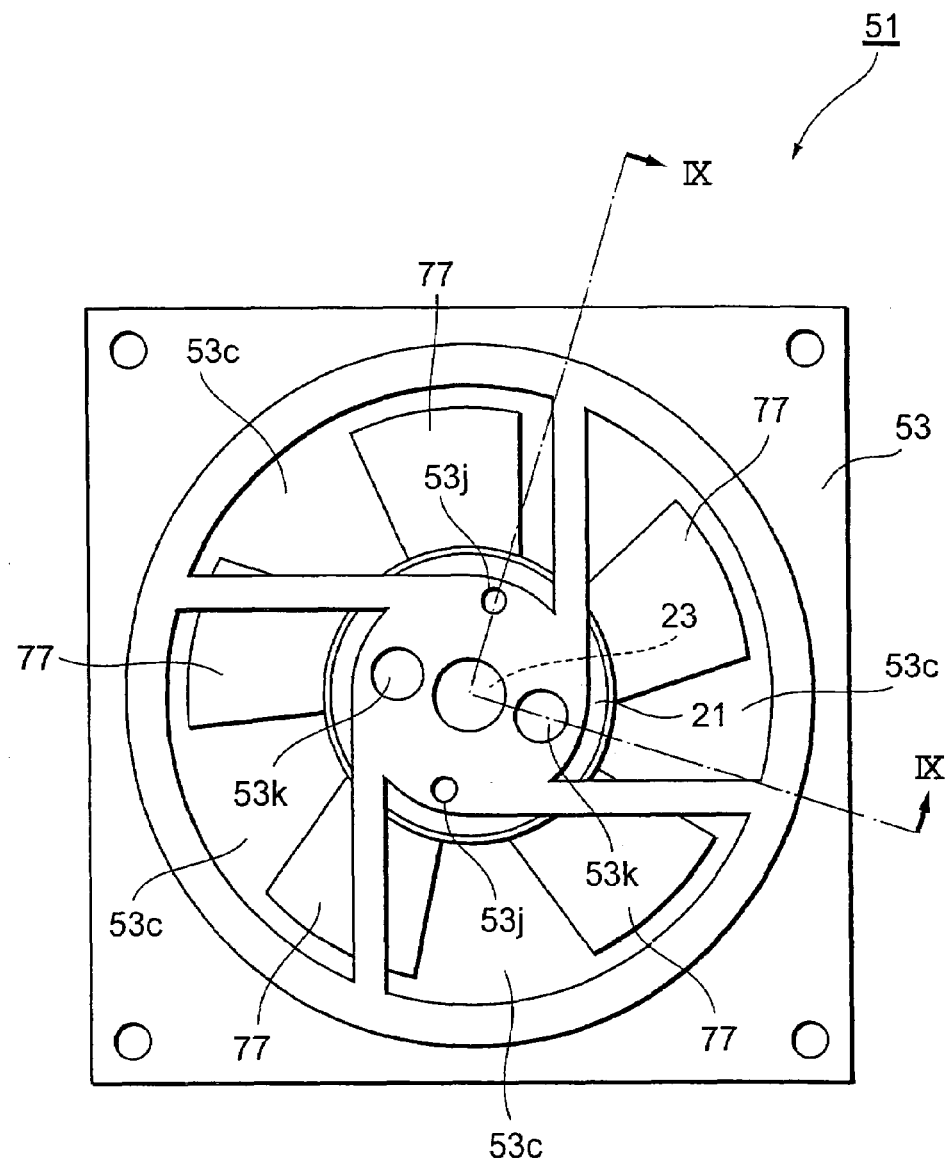
FIG. 8 is a plan view showing a brushless type fan motor according to a second embodiment of the present invention.
Figure 9:
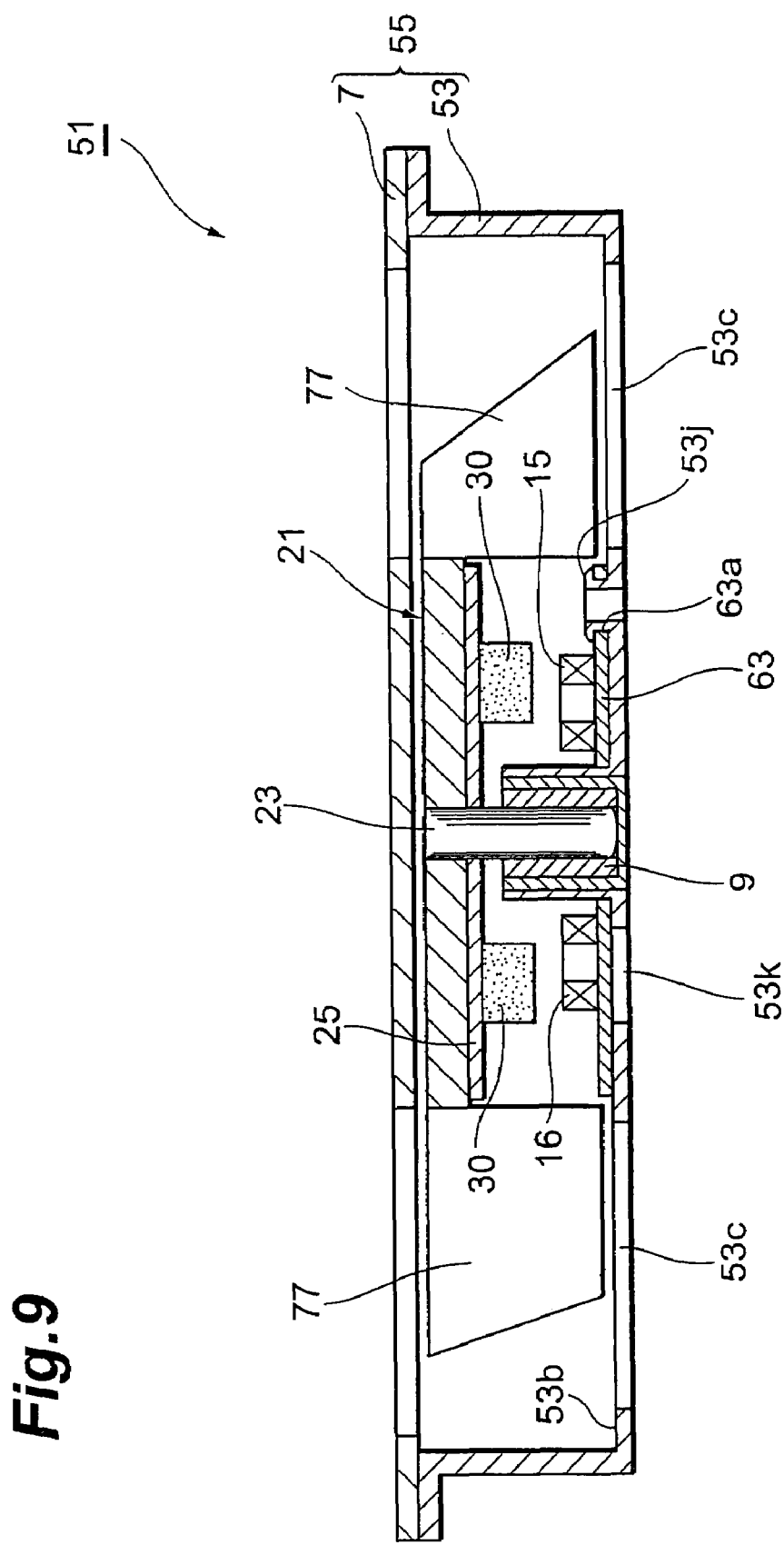
FIG. 9 is a IX-IX sectional view of the fan motor in FIG. 8.
Figure 10:
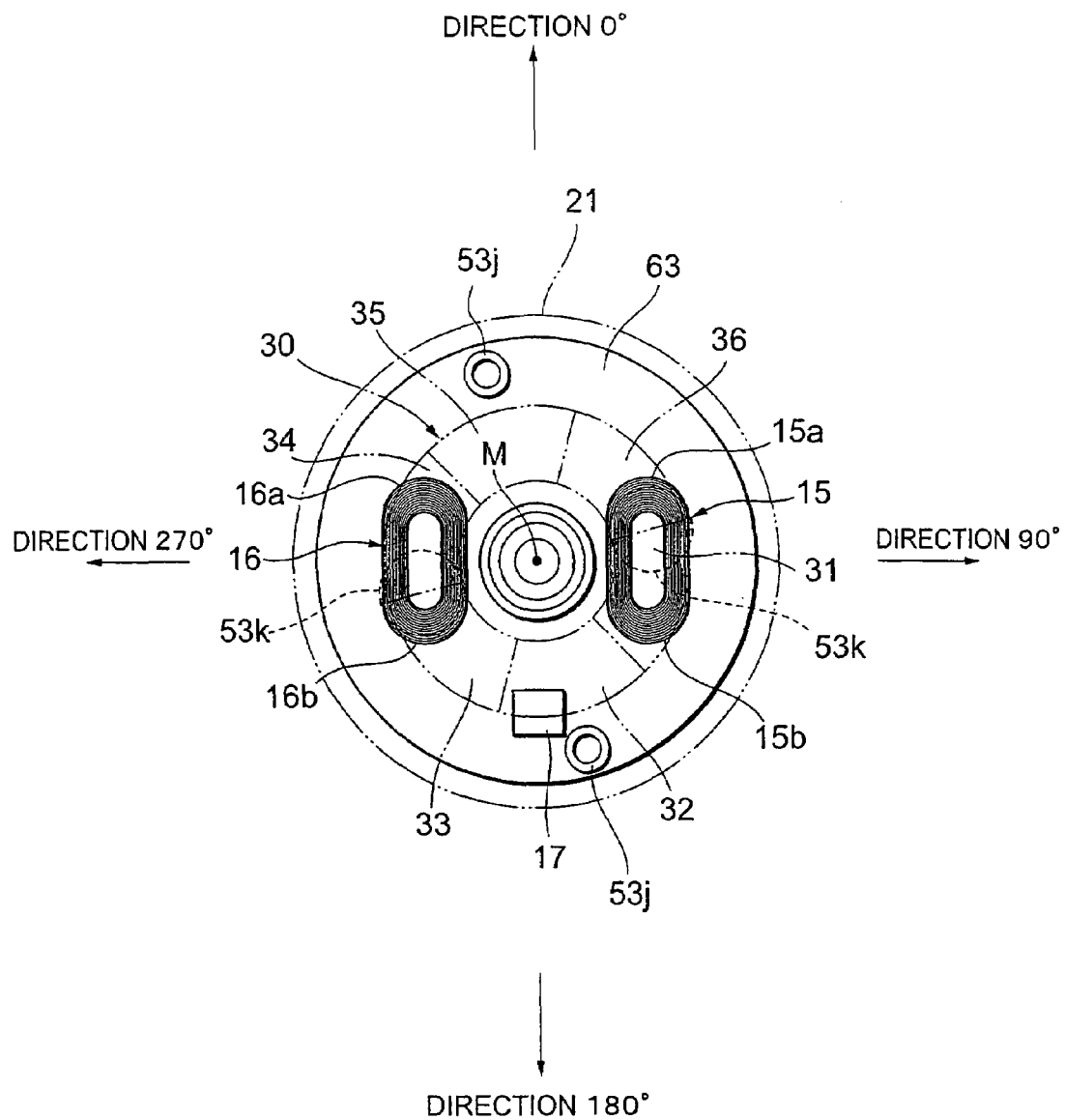
FIG. 10 is a plan view showing a positional relation among the protruding portions, openings, coils, and the magnet in the stopped state of the rotor of the fan motor in FIG. 8.
Figure 11:
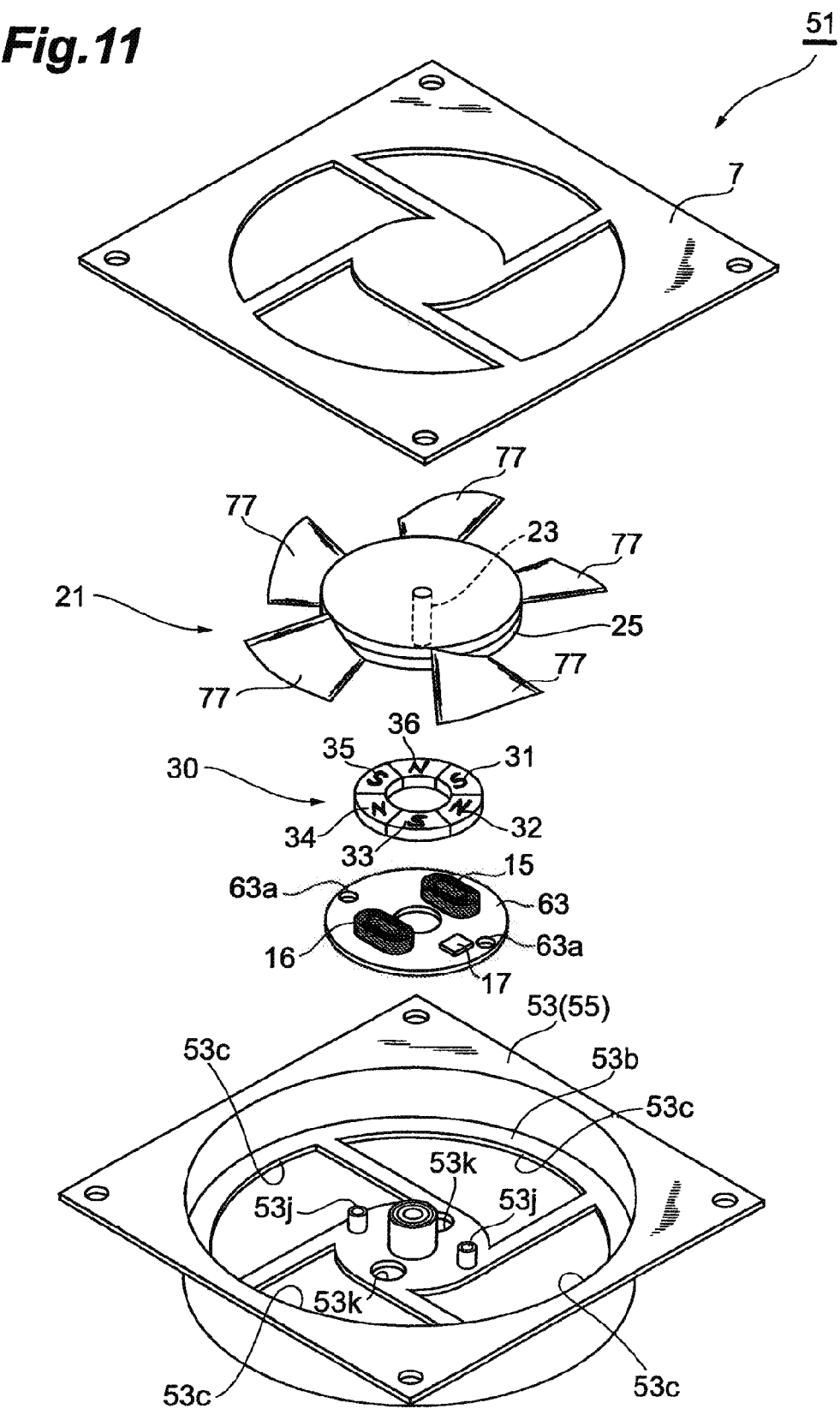
FIG. 11 is an exploded perspective view of the fan motor in FIG. 8.

As shown in FIG. 8 to FIG. 11, five vanes 77 are attached on the rotor 21 of a fan motor 51. These vanes 77 rotate integrally with the rotor 21 and the shaft 23 to generate a wind flowing in the direction perpendicular to the direction of rotation. Four blowing openings 53c to send out the wind generated by the vanes 77 are provided in a base member 53 of a housing 55 in the fan motor 51. That is, the fan motor 51 constitutes an axial flow fan motor. Incidentally, FIG. 8 shows a figure viewed from below in FIG. 9 and FIG. 10 shows a figure viewed from above in FIG. 9. FIG. 11 is an exploded perspective view of the fan motor in FIG. 8.

The base member 53 is formed of electromagnetic steel sheet and has two protruding portions 53j and two openings 53k provided equidistantly around the shaft 23. A circuit board 63 of the fan motor 51 is fixed to a component mounting surface 53b of the base member 53 by pressing these two protruding portions 53j. Since the protruding portions 53j and openings 53k have a structure similar to that of the protruding portions 3j and openings 3k of the fan motor 1 described above, a description thereof is omitted.

Next, positional relation among the protruding portions 53j, openings 53k, and the coil 15 on the circuit board 63 in this fan motor 51 will be described. The upward direction in FIG. 10 is assumed below to be the 0° direction and the direction of each portion viewed from the rotation center M of the rotor 21 is denoted as "XX° direction."

First, the coils 15 and 16 on the circuit board 63 are arranged similarly to the fan motor 1 described above. That is, the end 15a is positioned in the 60° direction, the end 15b in the 120° direction, the end 16a in the 300° direction, and the end 16b in the 240° direction. In contrast, the two protruding portions 53j of the base member 53 are arranged in a 165° direction and the 345° direction. The two openings 53k of the base member 53 are arranged in a 75° direction and the 255° direction.

Also with the positional relation described above, the two openings 53k are positioned respectively corresponding to the boundaries among the magnetic poles 31 to 36 of the six-pole magnet when the two protruding portions 53j are positioned corresponding to the centers of the magnetic poles 31 to 36. At this time, each of the four coil ends 15a, 15b, 16a, and 16b is positioned corresponding to any position other than the boundaries among the magnetic poles 31 to 36. More specifically, each of the four coil ends 15a, 15b, 16a, and 16b is positioned being shifted counterclockwise by 15° from the boundaries among the magnetic poles 31 to 36.

Thus, like the fan motor 1 described above, the stop position of the rotor 21 can reliably be controlled also by the fan motor 51 having the two protruding portions 53j and two openings 53k and operation effects similar to those of the fan motor 1 can be brought about.

Incidentally, in the fan motor 51, the same numerals are attached to the same components in the fan motor 1 and descriptions thereof are omitted.

By incorporating a brushless type fan motor according to the present invention into various kinds of electronic devices such as communication devices such as mobile phones, on-vehicle devices such as car navigation systems, computers such as personal computers, camcorders and projectors, a wind can reliably be sent out to these various kinds of electronic devices. Further, by applying to electronic devices that diffuse an aromatic substance, an aroma can reliably be diffused.

Figure 12:
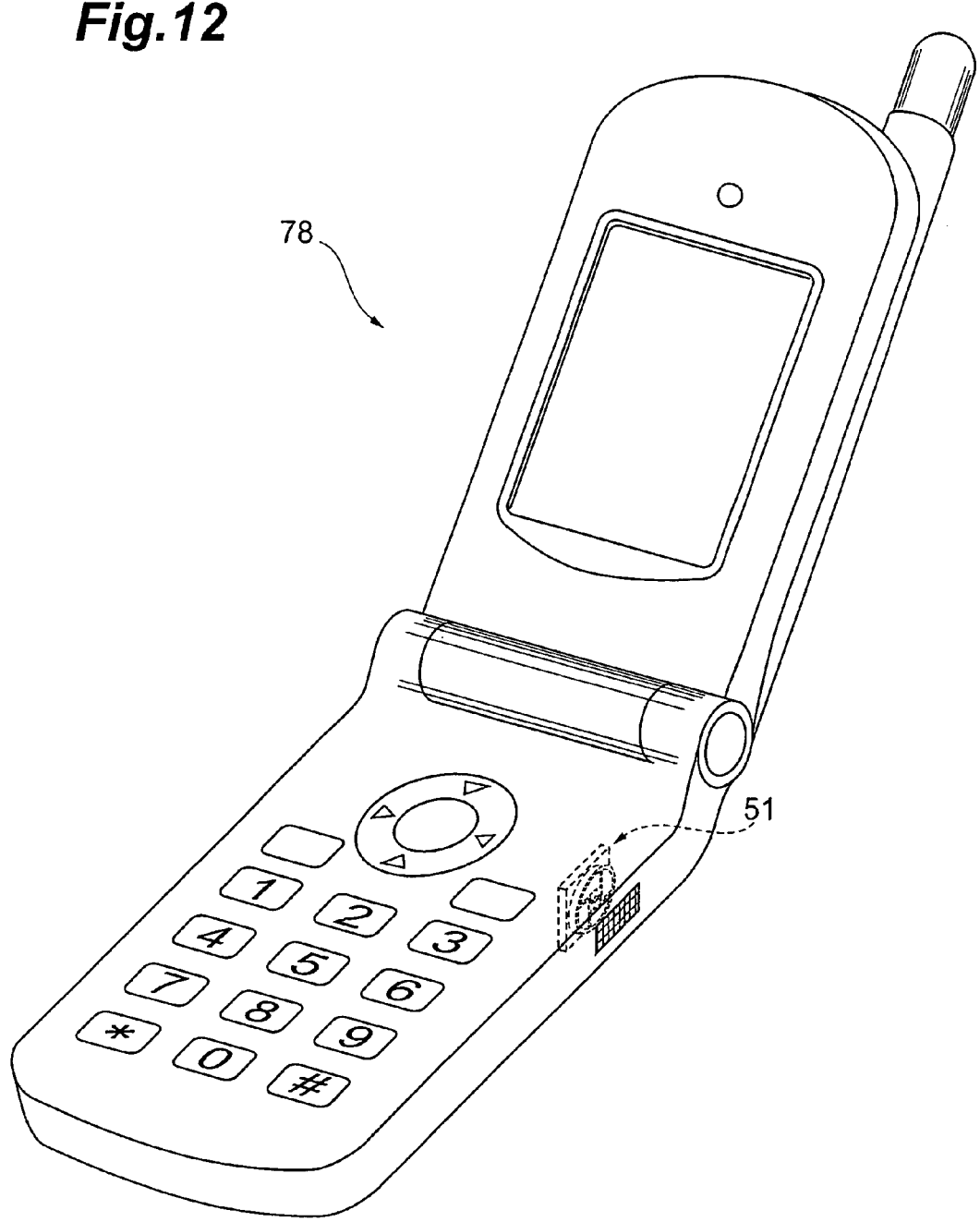
FIG. 12 is a perspective view showing a mobile phone by applying the fan motor in FIG. 8 thereto.

FIG. 12 is a perspective view showing a mobile phone by applying the fan motor in FIG. 8 thereto. A mobile phone 78 has the fan motor 51. The fan motor 51 is mounted inside the mobile phone 78 to cool heat sources (not shown) of the mobile phone 78.

What is claimed is:

1. A brushless motor comprising:
   a rotor having a magnet, the magnet including north and south magnetic pole pairs which are alternately arranged in a direction of rotation;
   a stator having coils provided so as to face the magnet, wherein the rotor is rotated by supplying a current to the coils of the stator; and
   a housing made of magnetic material,
   wherein the housing comprises:
      protruding portion provided integrally with the housing so as to face the magnet and protrude toward the magnet, and
      an opening facing the magnet,
   wherein the protruding portion and the opening has a positional relationship therebetween, such that when the protruding portion is positioned corresponding to a center of the magnetic pole of said magnetic pole pairs, the opening is positioned corresponding to a boundary between the magnetic poles of said magnetic pole pairs, and
   wherein the protruding portion and the coils has a positional relationship therebetween, such that when the protruding portion is positioned corresponding to the center of the magnetic pole of said magnetic pole pairs, both ends of the coils are positioned corresponding to positions other than the boundary between the magnetic poles of said magnetic pole pairs.

2. The brushless motor according to claim 1, further comprising a circuit board on which the coils are mounted, wherein the circuit board has positioning through hole formed corresponding to the protruding portion.

3. The brushless motor according to claim 2, wherein the protruding portion is formed in a cylindrical shape.

4. A brushless type fan motor comprising:
   the brushless motor according to claim 1; and
   vanes fixed to a rotation shaft of the rotor.

5. An electronic device comprising the brushless type fan motor according to claim 4.

6. A brushless type fan motor comprising:
   the brushless motor according to claim 2; and
   vanes fixed to a rotation shaft of the rotor.

7. A brusheless type fan motor comprising:
   the brushless motor according to claim 3; and
   vanes fixed to a rotation shaft of the rotor.

8. An electronic device comprising the brushless type fan motor according to claim 5.

9. An electronic device comprising the brushless type fan motor according to claim 6.

* * * * *